Figure 4:
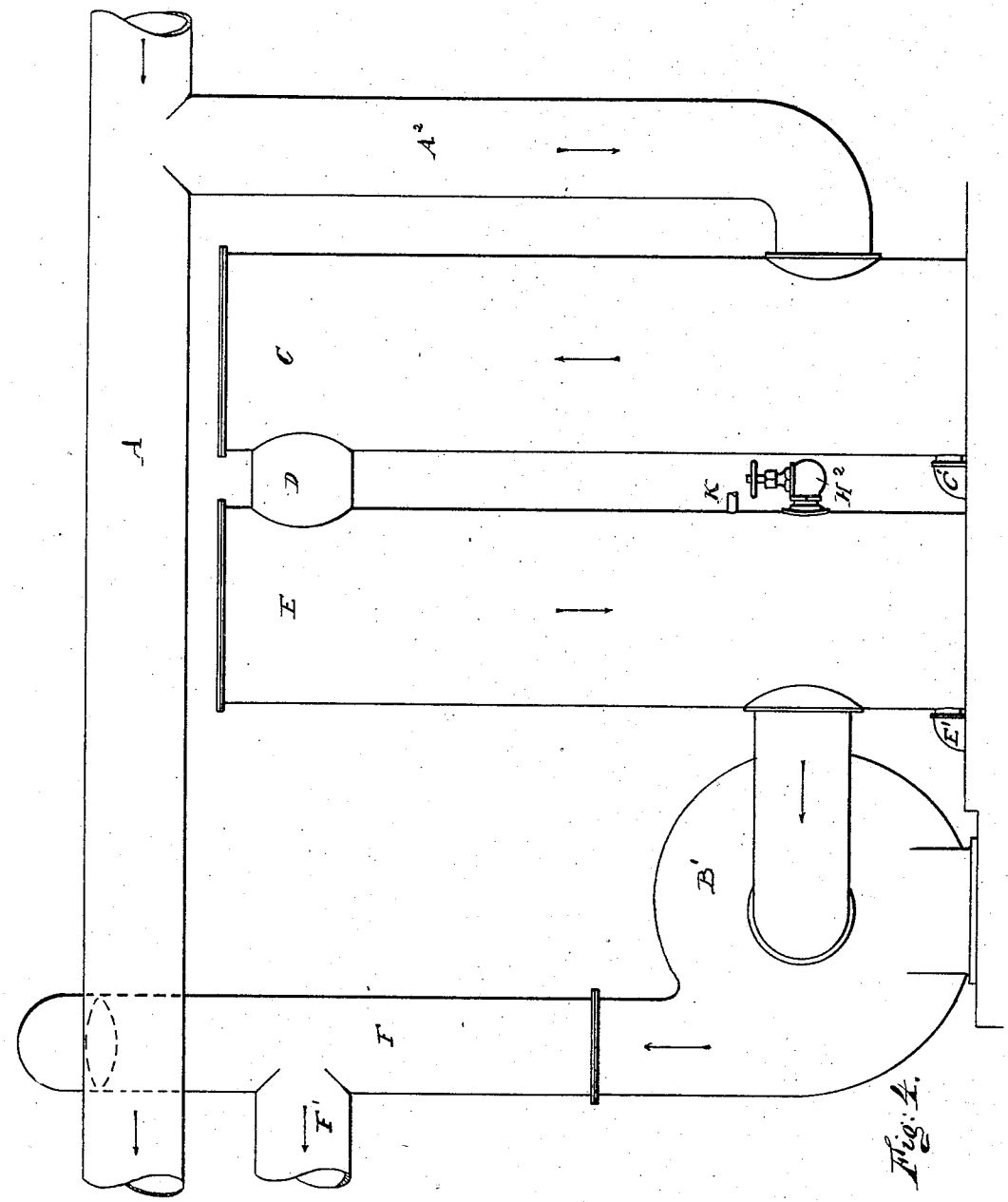

No. 787,593. PATENTED APR. 18, 1905.
A. STEINBART.
GAS PURIFIER.
APPLICATION FILED MAY 12, 1904.
2 SHEETS—SHEET 1.
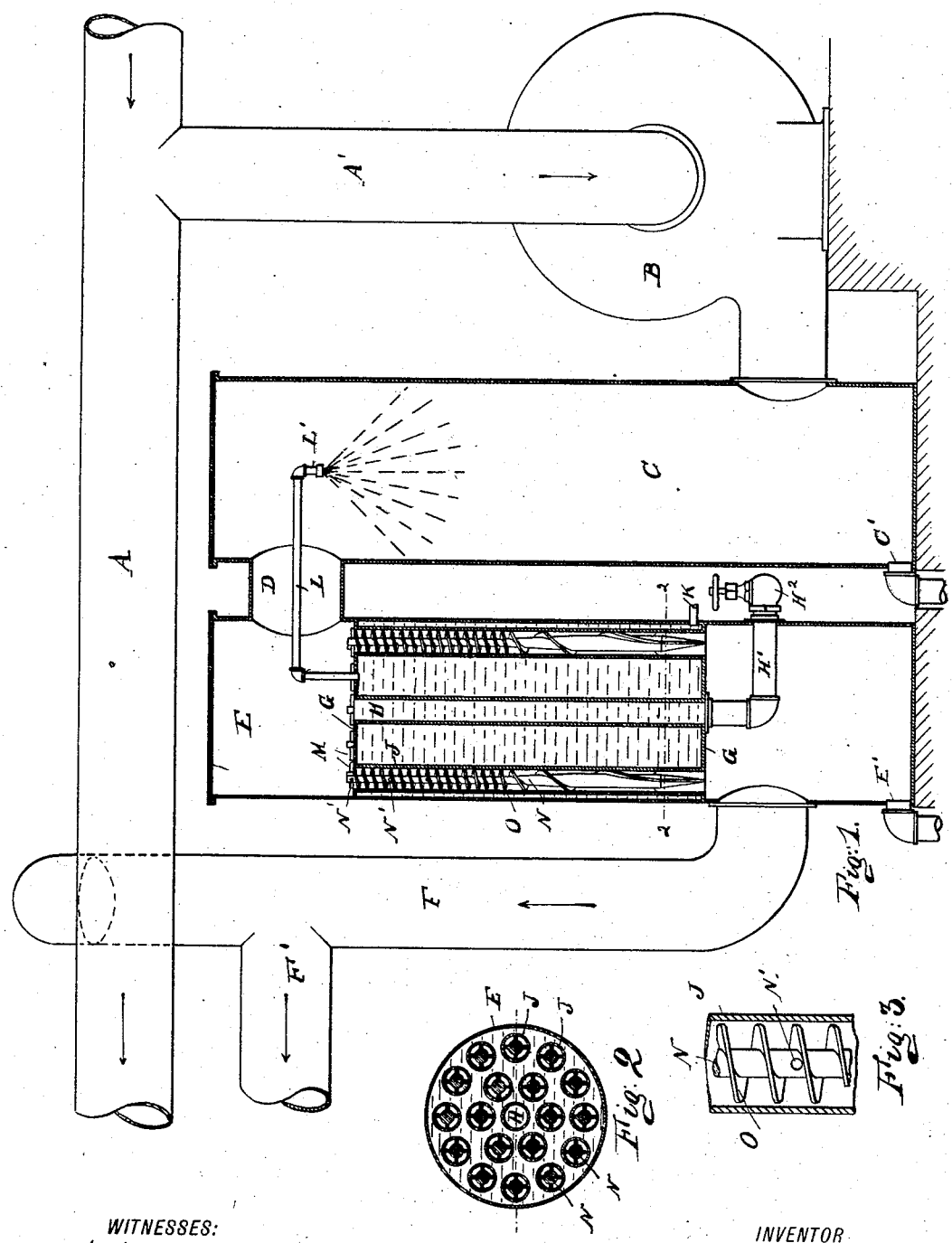
WITNESSES:
INVENTOR
A. Steinbart
BY
his ATTORNEY.

No. 787,593.

Patented April 18, 1905.

UNITED STATES PATENT OFFICE.

ALFRED STEINBART, OF CARLSTADT, NEW JERSEY.

GAS-PURIFIER.

SPECIFICATION forming part of Letters Patent No. 787,593, dated April 18, 1905.

Application filed May 12, 1904. Serial No. 207,590.

*To all whom it may concern:*

Be it known that I, ALFRED STEINBART, a citizen of the United States, residing at Carlstadt, in the county of Bergen, State of New Jersey, have invented certain new and useful Improvements in Centrifugal Gas-Purifiers, of which the following is a specification.

The object of my invention is to provide a new and improved centrifugal gas-purifier which is to be used for cleaning illuminating-gas, generator-gas, and blast-furnace gas and other gases or air.

In the accompanying drawings, in which like letters of reference indicate like parts in all the figures, Figure 1 is a vertical longitudinal sectional elevation of my improved gas-purifier, parts being shown in elevation. Fig. 2 is a horizontal sectional view on the line 2 2 of Fig. 1. Fig. 3 is an enlarged detail vertical sectional view of one of the tubes and the core therein. Fig. 4 is a side elevation showing a modified construction.

The apparatus here illustrated is especially adapted for the purification of blast-furnace gases, and attention is called to the fact that it is advantageous to purify these gases while hot. If gas containing dust or like impurities is rotated, the dust being heavier than the gas is forced by the centrifugal action away from the center of rotation and deposited on a surface surrounding the rotating quantity of gas. Centrifugal action increases in proportion with the square of the speed of the gas; but when the speed is uniform the centrifugal action increases in reverse proportion to the radius of rotation. High speed of the gas causes by friction, &c., eddy-currents of high speed, which interfere with the movement of the particles of dust toward the periphery, and therefore it is desirable to rotate the gas with moderate speed in a smaller circle. A surface on which the particles of dust can be deposited without being compelled to travel a great distance through the gas toward the periphery should be provided. A decrease of the diameter of the circle in which the gas rotates is thus advantageous, as it greatly facilitates the depositing of the dust. For these reasons the quantity of gas to be purified is subdivided into a number of smaller streams, and each is rotated within a smaller circle and the area of rotation is surrounded by a surface which is kept moistened for the purpose of catching and retaining the particles of dust, &c., thrown by centrifugal action out of the body of gas.

The gas arrives from a blast-furnace, generator, or other source through the main duct A, from which it can pass to the stoves, boilers, &c. A branch duct A' connects the main duct A with a rotary blower B or gas-forcing device of any improved construction, which blower is connected with the lower end part of an upright closed vessel C, having a drain-pipe C' at its bottom. This vessel C at or near its upper end is connected by a connecting-tube D with a like upright vessel E, also provided with a drain-pipe E' at its bottom. A tube or duct F extends upward from the lower part of the vessel E and at its upper end is connected with the main duct A, and from this duct F a branch duct F' leads to the gas engines or motors in which this purified gas is to be used. In the vessel E two horizontal partitions G are secured, which form the heads of a cylinder vessel, which partitions are connected by a vertical central tube H and by a series of vertical tubes J, surrounding the central tube H. The central tube H is open at the top and is connected at its bottom with a water-supply pipe H', having a suitable controlling cock or valve $H^2$. A pipe K for supplying water under pressure is connected with the bottom part of the vessel formed between the partitions G, and from the top of this vessel a pipe L extends through the connecting-tube D into the vessel C and is provided with a suitable spraying-nozzle L', which is located at or near the top of the vessel C. The tubes J are open at the top and bottom and in each a round core N is held centrally and is suspended by a pin M, which passes through a hole N' in said core N at the upper end of the same. A number of holes N' may also be provided beneath the upper end of the core, through which holes the pins M can also be passed for suspending the core at different elevations. The pin M rests on the top partition or head G. The core N is surrounded by a helically-wound web O, formed on it in the nature of a screw-thread, so as to form a helical duct or passage within the walls of the tube in which the core is held; but said web does not extend entirely to the inner surface of the tube J, as is clearly shown in Fig. 3. In the lower half of the tube the pitch of the web is gradually increased until finally it is made parallel with the core, and likewise the diameter of the core is gradually increased from the point where the pitch of the helical web increases, and the core is then again tapered off, so that it ends in a point.

The operation is substantially as follows: The fan B draws the gas from the main duct A and delivers it under pressure into the vessel C, from which it passes through the duct D into the upper part of the vessel E and is forced under pressure through the helical ducts in the tubes J, and thereby attains a great rotary speed. The rotary speed is very great in the upper part of each tube J, while in the lower part the speed is checked by the enlargement of the passage formed by the helical web, and at the same time a vacuum is formed at the lower part of each core in substantially the same manner as in an injector, which vacuum facilitates passage of the gas through the tubes J. The impurities are deposited by the action of centrifugal force upon the walls of the tube J, and the purified gas is discharged in the lower part of the vessel E, from where it passes through ducts F F′ either to the gas engines or motors, or, if these are not in use, through the duct A to the stoves or boilers or back again through the ducts A A′ to the blower B, and so until the gas is consumed for one purpose or another.

Cold water which is forced through the pipe K into the vessel formed between the heads or partitions G G cools the tubes J, and this water is finally discharged through the pipe L and from the nozzle L′ as a fine spray in the vessel C, and the hot gas passing up through the vessel C evaporates part of the water of the spray, and thus is saturated with moisture when it enters the tubes J. As these tubes J are cooled by the water surrounding them the moisture contained in the gas is condensed on the inner surfaces of these tubes and retains the dust deposited from the gas by the centrifugal action, and this condensed water gradually washes these impurities down into the lower part of the vessel E. The vessel E may be cleaned from time to time by a strong water-current passing through the pipe H into the upper part of the vessel E.

The gas is not only purified, but it is also cooled by passing through the apparatus. The degree of purity may be decreased—that is, the effectiveness of the machine may be decreased—by raising the cores N and holding them, by means of the pins M, in the raised position, thereby decreasing the effective passage for rotating the quantity of gas, and by so doing less power will be required for the fan.

As shown in Fig. 4, a suction fan or device B′ may be used in place of the pressure-blower B, but must be located at the outlet end of the apparatus, and the inlet end must be connected direct with the gas-main by the tube $A^2$.

With both constructions described a difference in the pressure of the gas is produced, compelling the gas to traverse the apparatus.

Having described my invention, what I claim as new, and desire to secure by Letters Patent, is—

1. In a gas-purifier, the combination with a vessel having tubes, each containing a helical duct, of means for conducting water into said vessel, means for conveying gas to said ducts, means for conducting water from the above-mentioned vessel having tubes, and a spraying device connected with said means for conducting water from said vessel and located in the gas-conduit in advance of the said ducts, substantially as set forth.

2. In a gas-purifier, the combination with two vessels, connected at their upper ends, of means for conveying gas into one of said vessels, means for causing a difference in pressure in said vessels, means for withdrawing gas from the other vessel, a water-spraying device in the first-mentioned vessel, and a series of vertical gas-ducts in the second-mentioned vessel, each duct having a helical path for the gas, substantially as set forth.

3. In a gas-purifier, the combination with a vessel, of two partitions in the same, tubes connecting the partitions, cores in said partitions, which cores gradually increase in diameter and then decrease at one end, of a web extending helically around each core, the pitch of the web gradually increasing at the point where the diameter of the core increases, said web ending parallel with the axis of the core to the point of the core, substantially as set forth.

4. In a gas-purifier, the combination with a vessel, of partitions in the same, vertical tubes connecting the partitions, cores hung in said tubes, pins extending across the upper ends of said tubes and through the upper ends of the cores, and resting on the upper partition and helical webs formed on said cores, substantially as set forth.

5. In a gas-purifier, the combination with a vessel, of two horizontal partitions in the same, a central tube uniting them, open at its upper end and a water-supply pipe connected with its lower end, a series of tubes connecting the horizontal partitions around the central tube, a core in each of the tubes surrounding the central tube, each core having a helical web and means for conveying gas into the upper part of said vessel and through the tubes surrounding the central tube, substantially as set forth.

In testimony whereof I have signed my name to this specification in the presence of two subscribing witnesses.

ALFRED STEINBART.

Witnesses:
 OSCAR F. GUNZ,
 SOPHIE M. BAEDER.